(12) United States Patent
Colgrave et al.

(10) Patent No.: US 8,561,010 B2
(45) Date of Patent: Oct. 15, 2013

(54) SOFTWARE APPROVAL PROCESS USING SERVICE GOVERNANCE

(75) Inventors: John Colgrave, Eastleigh (GB); Devaprasad K. Nadgir, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 609 days.

(21) Appl. No.: 12/817,601

(22) Filed: Jun. 17, 2010

(65) Prior Publication Data
US 2011/0314439 A1    Dec. 22, 2011

(51) Int. Cl.
*G06F 9/44* (2006.01)
(52) U.S. Cl.
USPC ............ 717/101; 717/102; 717/107; 717/125
(58) Field of Classification Search
USPC .......................... 717/101, 107, 109, 125, 126
See application file for complete search history.

(56) References Cited

U.S. PATENT DOCUMENTS

| | | | |
|---|---|---|---|
| 7,680,752 B1 * | 3/2010 | Clune et al. ...................... 706/45 |
| 2003/0139962 A1 | 7/2003 | Nobrega et al. |
| 2005/0043979 A1 | 2/2005 | Soares et al. |
| 2007/0179790 A1 | 8/2007 | Leitch et al. |
| 2008/0281833 A1 | 11/2008 | Cain et al. |
| 2009/0006147 A1 * | 1/2009 | Padmanabhan .................... 705/7 |
| 2009/0043631 A1 * | 2/2009 | Finlayson et al. ................. 705/9 |
| 2009/0113385 A1 * | 4/2009 | Appleyard et al. ........... 717/108 |
| 2009/0138795 A1 * | 5/2009 | Liu et al. ........................ 715/234 |
| 2009/0171720 A1 * | 7/2009 | Crook et al. ....................... 705/7 |
| 2009/0198534 A1 | 8/2009 | Brown et al. |
| 2010/0125618 A1 * | 5/2010 | Dutta et al. ................... 707/822 |

FOREIGN PATENT DOCUMENTS

| | | |
|---|---|---|
| EP | 2154628 A2 | 2/2010 |
| WO | 03085503 A1 | 10/2003 |

OTHER PUBLICATIONS

Lau et al., "Developing XML Web services with WebSphere Studio Application Developer", 2002.*
Weinreich et al., "A Service Lifecycle and Information Model for Service-Oriented Architectures", 2009.*
Gary McBride, "The role of SOA quality management in SOA service lifecycle management", Apr. 2007.*
Brown et al., "SOA Development Using the IBM Rational Software Development Platform: A Practice Guide", Sep. 2005.*
ECOM Enterprises, Inc., "Flexible Workflow Management and Content Approval Process", http://www.ecomenterprises.com/index.cfm?page=solutions2&crid=114, retrieved date: Jun. 4, 2010.

* cited by examiner

*Primary Examiner* — Phillip H Nguyen
(74) *Attorney, Agent, or Firm* — Law Office of Jim Boice

(57) ABSTRACT

A computer implemented method, system and/or computer program product approve software objects for deployment. A change in a lifecycle state of a software object is detected in a governance service registry, resulting in the implementation of a governance lifecycle process for the software object by transmitting an approval process input to a governance approval process engine. In response to the governance approval process engine approving the software object for deployment, the first object is automatically deployed to a production service registry.

16 Claims, 4 Drawing Sheets

US 8,561,010 B2

SOFTWARE APPROVAL PROCESS USING SERVICE GOVERNANCE

BACKGROUND

The present disclosure relates to the field of computers, and specifically to computer software. Still more particularly, the present disclosure relates to approving computer software for deployment.

BRIEF SUMMARY

A computer implemented method, system and/or computer program product approve software objects for deployment. A change in a lifecycle state of a software object is detected in a governance service registry, resulting in the implementation of a governance lifecycle process for the software object by transmitting an approval process input to a governance approval process engine. In response to the governance approval process engine approving the software object for deployment, the first object is automatically deployed to a production service registry.

DETAILED DESCRIPTION

As will be appreciated by one skilled in the art, the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Figure 1:
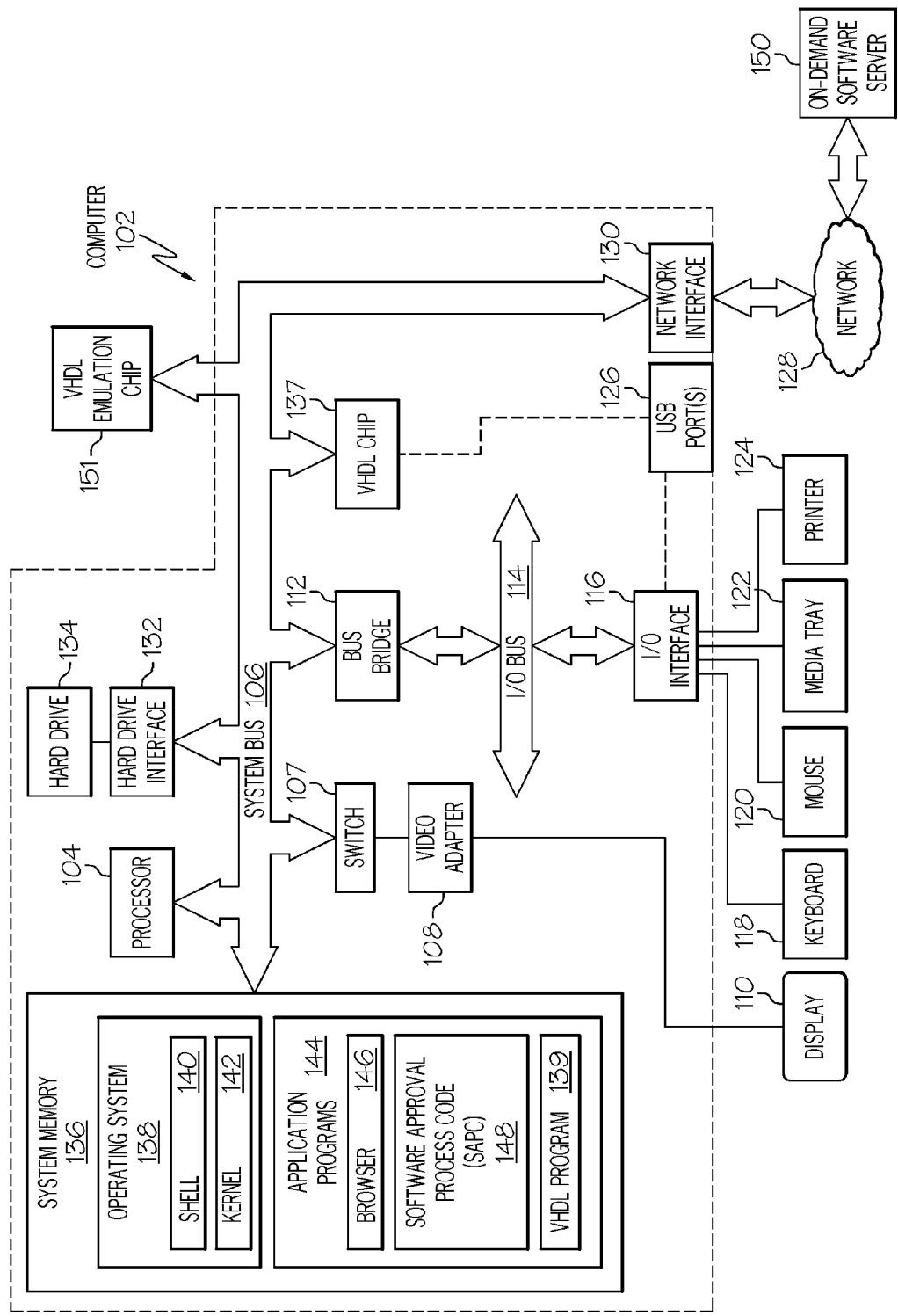
FIG. 1 depicts an exemplary computer in which the present disclosure may be implemented.

With reference now to the figures, and in particular to FIG. 1, there is depicted a block diagram of an exemplary computer 102, which may be utilized by the present disclosure. Note that some or all of the exemplary architecture, including both depicted hardware and software, shown for and within computer 102 may be utilized by on-demand software server 150.

Computer 102 includes a processor unit 104 that is coupled to a system bus 106. Processor unit 104 may utilize one or more processors, each of which has one or more processor cores. A video adapter 108, which drives/supports a display 110, is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, preferably mechanical, that allows the display 110 to be coupled to the system bus 106, and thus to be functional only upon execution of instructions (e.g., software approval process code—SAPC 148 described below) that support the processes described herein.

System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and (if a VHDL chip 137 is not utilized in a manner described below), external USB port(s) 126. While the format of the ports connected to I/O interface 116 may be any known to those skilled in the art of computer architecture, in a preferred embodiment some or all of these ports are universal serial bus (USB) ports.

As depicted, computer 102 is able to communicate with an on-demand software server 150 via network 128 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present disclosure will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with on-demand software server 150 and other described computer systems.

Application programs 144 in computer 102's system memory (as well as on-demand software server 150's system memory) also include a software approval process code (SAPC) 148. SAPC 148 includes code for implementing the processes described below, including those described in FIGS. 2-4. In one embodiment, computer 102 is able to download SAPC 148 from on-demand software server 150, including in an on-demand basis, such that the code from SAPC 148 is not downloaded until runtime or otherwise immediately needed by computer 102. Note further that, in one embodiment of the present disclosure, on-demand software server 150 performs all of the functions associated with the present disclosure (including execution of SAPC 148), thus freeing computer 102 from having to use its own internal computing resources to execute SAPC 148.

Also stored in system memory 136 is a VHDL (VHSIC hardware description language) program 139. VHDL is an exemplary design-entry language for field programmable gate arrays (FPGAs), application specific integrated circuits (ASICs), and other similar electronic devices. In one embodiment, execution of instructions from SAPC 148 causes VHDL program 139 to configure VHDL chip 137, which may be an FPGA, ASIC, etc.

In another embodiment of the present disclosure, execution of instructions from SAPC 148 results in a utilization of VHDL program 139 to program a VHDL emulation chip 151. VHDL emulation chip 151 may incorporate a similar architecture as described above for VHDL chip 137. Once SAPC 148 and VHDL program 139 program VHDL emulation chip 151, VHDL emulation chip 151 performs, as hardware, some or all functions described by one or more executions of some or all of the instructions found in SAPC 148. That is, the VHDL emulation chip 151 is a hardware emulation of some or all of the software instructions found in SAPC 148. In one embodiment, VHDL emulation chip 151 is a programmable read only memory (PROM) that, once burned in accordance with instructions from SAPC 148 and VHDL program 139, is permanently transformed into a new circuitry that performs the functions needed to perform the process described below in FIGS. 2-4.

The hardware elements depicted in computer 102 are not intended to be exhaustive, but rather are representative to highlight essential components required by the present disclosure. For instance, computer 102 may include alternate memory storage devices such as magnetic cassettes, digital versatile disks (DVDs), Bernoulli cartridges, and the like. These and other variations are intended to be within the spirit and scope of the present disclosure.

Figure 2:
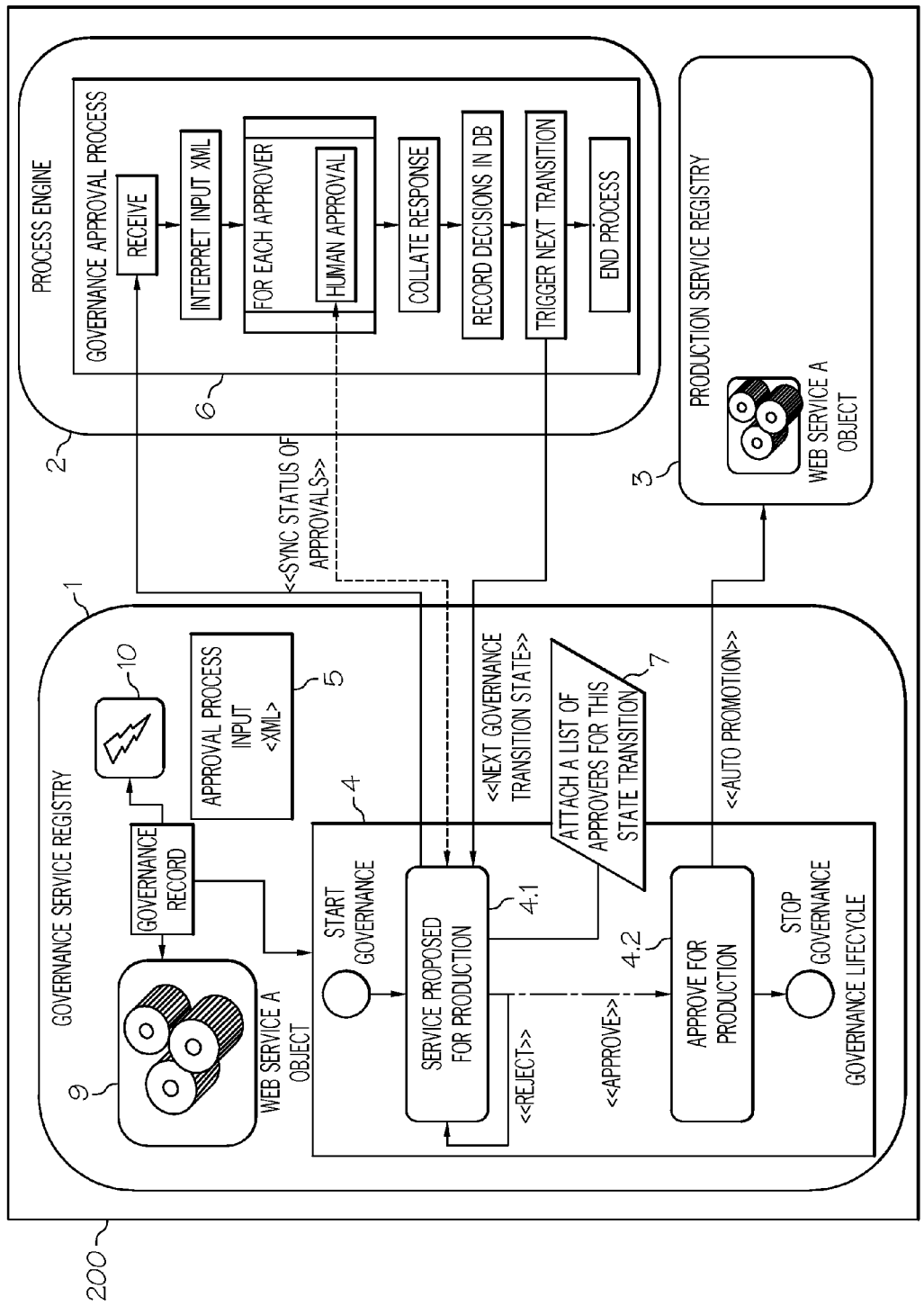
FIG. 2 illustrates a relationship among a governance service registry, a governance approval process engine, and a production service registry in accordance with an embodiment of the present disclosure.
Figure 3:
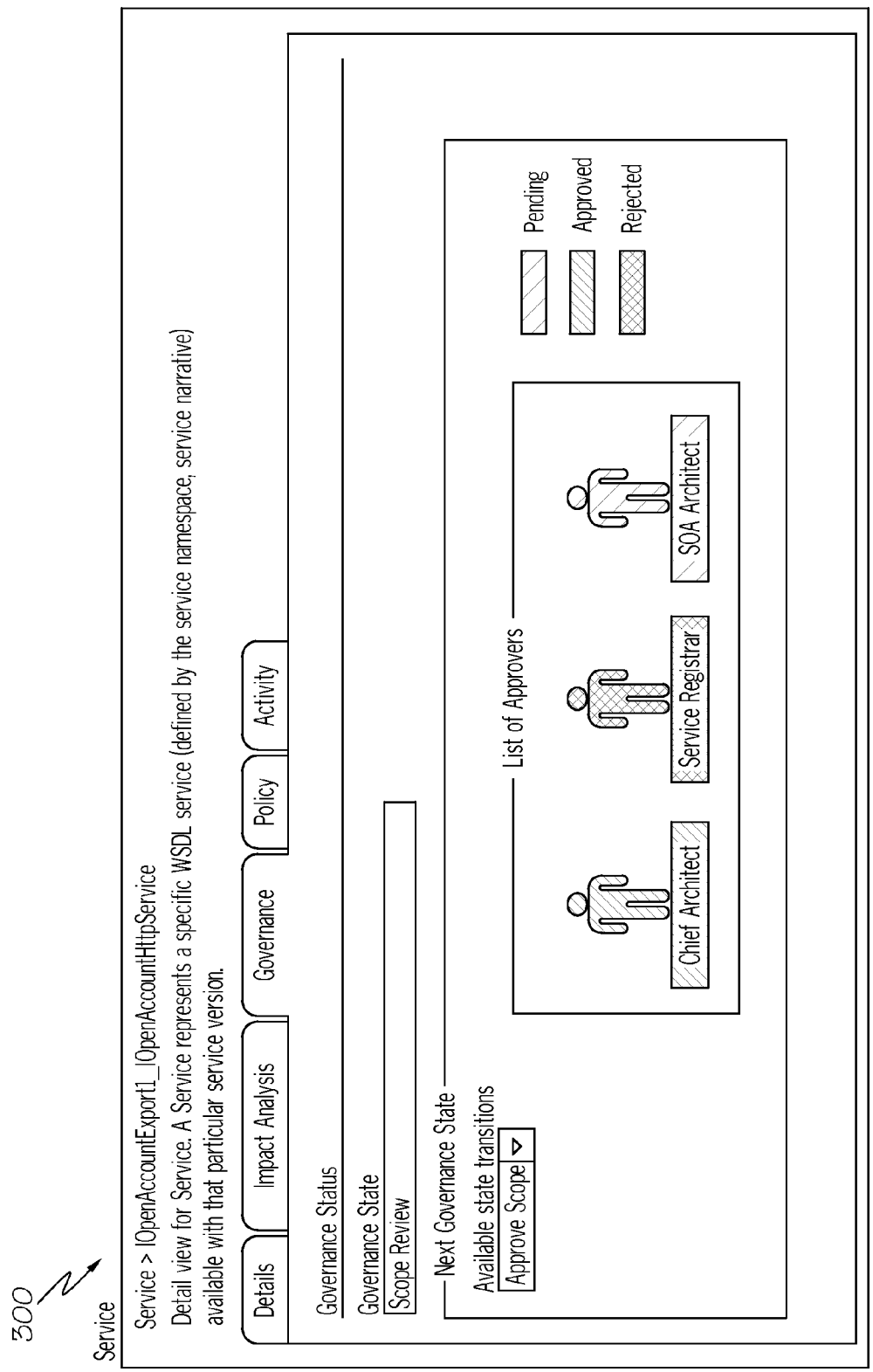
FIG. 3 is an exemplary user interface displaying a status of an approval/review process for an object/service.

With reference now to FIG. 2, logic 200 (e.g., SAPC 148 shown in FIG. 1 executing in computer 102) comprises a web service 9, which is governed in a governance service registry 1. As described herein, web service 9 is an exemplary first object that needs approval before being deployed to a production service registry 3. The governance service registry 1 is a system for storing, accessing and managing information, commonly referred to as service metadata, used in the selection, invocation, management, governance and reuse of services in a successful service oriented architecture (SOA). Thus, governance service registry 1 is used to store information about services in a client's systems, a SOA system, or in other organizations' systems, that are already in use, are planned for future use, or that the client and/or SOA system simply need to be aware of. For example, an application can check the governance service registry 1 just before invoking web service 9 to locate the service instance that best satisfies the functionality and performance needs of the web service 9. The governance service registry 1 also plays a role in other stages of an SOA lifecycle.

A governance lifecycle process 4 is associated with this first object (web service 9) through a governance record 8. The governance record 8 is updated as web service 9 goes through various lifecycle transition states, including interim states in the development of the web service 9, as well as a final completion state of the web service 9. A governance service registry administrator configures a list of approvers 7 that are required to be included in the governance approval process for a target governance state of the web service 9. When the governance record 8 for the web service 9 reaches a governance state 4.1 that has a list of associated approvers (from the list of approvers 7), an approval process in a governance approval process engine, depicted as process engine 2, is automatically triggered. This invocation passes a dynamically constructed XML input called an approval process input 5 for a governance approval process 6. The approval process input 5 comprises the following in an XML format: Meta-data information about the service record in the governance registry; (e.g., a uniform resource indicator (URI) used to locate the web service 9 object); a list of approvers and their unique domain user IDs; possible next transitions; and decision logic to select the next transition state after the approval workflow completes.

The governance approval process 6 takes into account the processing of the input XML and generating an equal number of human task sub-processes. The individual users who are assigned as approvers or reviewers in the approval process are assigned the task to either approve or reject the transition on to the next state in service registry (e.g., from 4.1 to 4.2). The status of the approval/review is synchronized back to the service registry record. Once all the approvers respond, the results are collated and the decision logic is applied to choose the next transition (approve or reject). In one embodiment, a real-time status display is presented, such as that shown in user interface (UI) 300 in FIG. 3. The real-time status display shown in exemplary UI 300 depicts a title of each approver/ reviewer, as well as the status (e.g., pending, approved, rejected) of their review of a specific object (e.g., an SOA object such as web service 9). The approvers/reviewers depicted in UI 300 may all be users of a same computer system (e.g., computer 102), or they may be remote users of other computers (not shown) that communicate with the main computer 102.

The approval process for approving the web service 9 uses an application programming interface (API—not shown) exposed by the governance service registry 1. This API triggers the next governance state transition. In the example shown above, the governance state is moved to "Approve for production" 4.2 from "Service proposed for production" 4.1. If the web service 9 is approved for production, the service record (i.e., an updated version of the governance record 8) is automatically moved from the environment of the governance service registry 1 to the environment of the production service registry 3.

Note that a second object is also part of the governance service registry 1. This second object is depicted as a service level description object 10 that describes guaranteed features of the web service 9 when deployed. Just as the number of reviewers for the web service 9 may be varied and even stochastic (random), the number of reviewers for approving the service level description object 10 may also be varied/random. The reviewers used to approve the web service 9 and the reviewers used to approve the service level description object 10 may be the same, completely different (mutually exclusive), or overlapping. In one embodiment, approval of the service level description object 10 follows some or all of the same governance/approval processes described herein in association with elements 1-8 used to review the web service 9.

Figure 4:
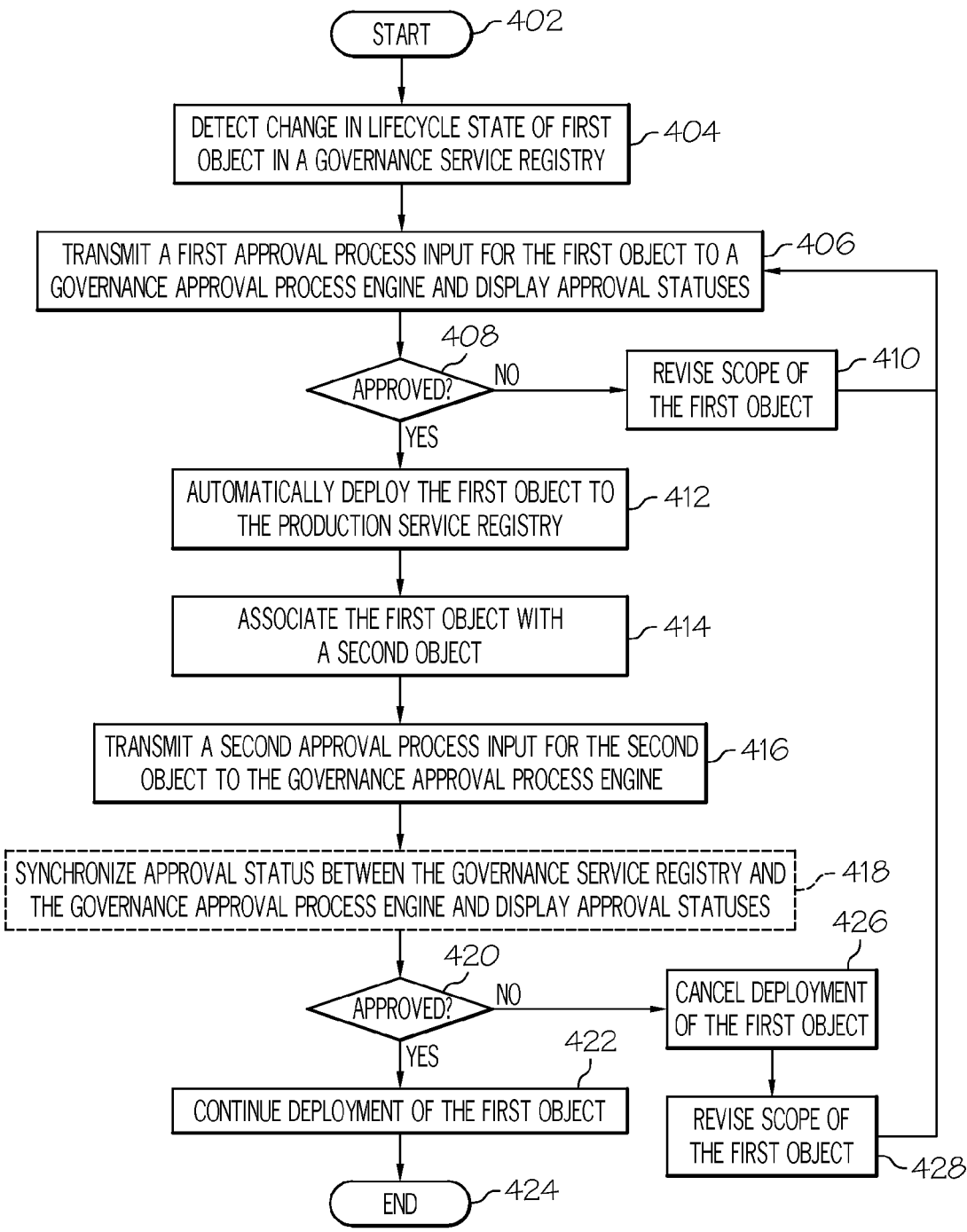
FIG. 4 is a high level flow chart of one or more exemplary steps performed by a computer to approve software for deployment.

With reference now to FIG. 4, a high level flow chart of one or more exemplary steps taken by a processor to approve software objects, including web services, for deployment is depicted. After initiator block 402, a change in a lifecycle state of a first object is detected by using a governance service registry (block 404). This first object is a software object (e.g., a web service) that is proposed for deployment to a production service registry. The governance service registry is a system for storing, accessing and managing service metadata used in selecting, invocating, managing, governing and reusing services in a service oriented architecture (SOA).

As described in block 406, in response to detecting the change in the lifecycle state of the first object, a governance lifecycle process is implemented for the first object by transmitting a first approval process input to a governance approval process engine. This governance approval process engine is dynamically configurable to change approving parties (i.e., specifying how many approving parties are required; which specific approving parties, identified by title and/or name, are required, etc.) and corporate rules (i.e., legal, internal policy oriented, mission-directed, etc.) required to deploy the web service object to the production service registry. In one embodiment, the governance approval process engine is a long running business process execution language (BPEL) process engine. BPEL is an executable language for specifying interactions with the web service. In one embodiment, information is exported from and imported to the web service exclusively by BPEL instructions.

The first approval process input describes a first set of one or more reviewers needed to approve the first object for deployment. The percentage of reviewers can be set to any predetermined level, from a single reviewer approving the deployment, all of the reviewers approving the deployment, or any number in between. If the reviewers do not approve the first object (query block 408), then the scope of the first object can be revised (block 410). That is, if the reviewers do not approve the first object for deployment, then software engineers can rewrite the first object and resubmit it to the approvers (e.g., an approving governance panel).

However, if the first object is approved for deployment to the production service registry by the governance approval process engine, then the first object is automatically deployed to the production service registry, from which it can be accessed by users/customers (block 412).

As described above with respect to elements 9 and 10 shown in FIG. 2, the web service object can be associated with a service level description object (block 414). This service level description object describes guaranteed features of the first object when deployed, such as performance levels (e.g., data throughput, memory availability, bandwidth, etc.), cost, on-line and/or live support, web service availability, etc. In response to the web service object being associated with the service level description object, the governance lifecycle process is implemented for the service level description object by transmitting a second process input to the governance approval process engine (block 416). This second approval process input describes a second set of one or more reviewers needed to approve the service level description object, as well as other XML data such as review processes, possible next transitions, decision logic to select the next transition state, etc. Note that in one embodiment the first process input and the second process input both describe unique human tasks required of the respective first and second set of one or more reviewers. Examples of such unique human tasks include, but are not limited to, determining if a web service falls within the scope of products traditionally offered by a web service provider, determining if the web service meets legal and regulatory requirements (e.g., governmental regulations regarding securities, banking, health care, etc.), meets a proper price point that makes the web service attractive to a customer while still being profitable to the web service provider, meets technical and operations guidelines (i.e., the web service performs as described in advertisement, user manuals, etc.), etc. Optionally, the approval status (i.e., status of the review, as depicted in exemplary manner in FIG. 3) is synchronized between the governance service registry and the governance approval process engine (block 418), and is then displayed on the UI 300 shown in FIG. 3.

If the second set of one or more reviewers approve the service level description object (query block 420), the automatic deployment of the first object to the production service registry continues (block 422) and the process ends (terminator block 424). However, if the second set of one or more reviewers fails to approve the service level description object (query block 420), then the deployment of the first object to the production service registry is automatically cancelled (block 426), thus allowing programmers the opportunity (block 428) to revise the scope of the first object (i.e., the web service) and/or the second object (i.e., the service level description object).

The approach described herein affords a flexible workflow for approval process. The process described herein provides an integrated approach to bring a stochastic (i.e., using varying numbers of approvers/reviewers of software objects and/or web services) approval workflow for service governance. Enterprises can choose to alter this approval process to contain industry specific checks and pre-defined templates adhering to enterprise specific requirements (i.e., adherence to standards) for governance decision making.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the disclosure of the present application in detail and by reference to illustrative embodiments thereof, it will be apparent that modifications and variations are possible without departing from the scope of the disclosure defined in the appended claims.

What is claimed is:

1. A computer implemented method of approving software objects for deployment, the computer implemented method comprising:
   a processor detecting a change in a lifecycle state of a first object in a governance service registry, wherein the first object is a software object that is a web service object, wherein the web service object is proposed for deployment to a production service registry, and wherein the governance service registry is a system for storing, accessing and managing service metadata used in selecting, invoking, managing, governing and reusing services in a service oriented architecture (SOA);
   in response to detecting the change in the lifecycle state of the first object, implementing a governance lifecycle process for the first object by transmitting a first approval process input to a governance approval process engine, wherein the first approval process input describes a first set of one or more reviewers needed to approve the first object for deployment, wherein the first approval process input comprises a description of a quantity and credentials of reviewers needed to approve the first object for deployment, wherein the quantity describes how many approving parties are required to approve the first object for deployment, and wherein the credentials identify a required title of each party required to approve the first object for deployment;
   associating the web service object with a service level description object, wherein the service level description object describes guaranteed features of the first object when deployed;
   in response to said associating of the web service object with the service level description object, implementing the governance lifecycle process for the service level description object by transmitting a second approval process input to the governance approval process engine, wherein the second approval process input describes a second set of one or more reviewers needed to approve the service level description object, wherein the first set of one or more reviewers and the second set of one or more reviewers are overlapping sets of same and different reviewers;
   displaying an approval status of each person in the first and second sets of one or more reviewers, wherein the approval status represents an approval status from each person in the first and second sets of one or more reviewers, and wherein the approval status is from a group consisting of pending, approved and rejected;
   in response to the governance approval process engine approving the first object for deployment to the production service registry, automatically deploying the first object to the production service registry;
   in response to the second set of one or more reviewers approving the service level description object, continuing to automatically deploy the web service object to the production service registry; and
   in response to the second set of one or more reviewers failing to approve the service level description object, automatically cancelling deployment of the web service object to the production service registry.

2. The computer implemented method of claim 1, wherein the governance approval process engine is dynamically configurable to change approving parties and corporate rules required to deploy the web service object to the production service registry.

3. The computer implemented method of claim 1, wherein the governance approval process engine is a long running business process execution language (BPEL) process engine.

4. The computer implemented method of claim 1, wherein the first process input and the second process input both describe unique human tasks required of the respective first and second set of one or more reviewers.

5. The computer implemented method of claim 1, further comprising:

in response to the web service object and the service level description object both failing to be approved by the governance approval process engine, revising a scope of the web service object to meet requirements of the service level description object.

6. The computer implemented method of claim 1, wherein the lifecycle state is an interim state in a development of the first object.

7. The computer implemented method of claim 1, wherein the lifecycle state is a final completion state of the first object.

8. The computer implemented method of claim 1, further comprising:
synchronizing approval status, of the first object, between the governance service registry and the governance approval process engine.

9. The computer implemented method of claim 1, wherein the quantity of how many approving parties are required to approve the first object for deployment is a stochastic number that is randomly determined.

10. A computer system comprising:
a central processing unit; and
a computer readable memory coupled to the central processing unit, wherein the computer readable memory comprises software which, when executed, causes the central processing unit to implement:
detecting a change in a lifecycle state of a first object in a governance service registry, wherein the first object is a software object that is a web service object, wherein the web service object is proposed for deployment to a production service registry, and wherein the governance service registry is a system for storing, accessing and managing service metadata used in selecting, invoking, managing, governing and reusing services in a service oriented architecture (SOA);
in response to detecting the change in the lifecycle state of the first object, implementing a governance lifecycle process for the first object by transmitting a first approval process input to a governance approval process engine, wherein the first approval process input describes a first set of one or more reviewers needed to approve the first object for deployment, wherein the first approval process input comprises a description of a quantity and credentials of reviewers needed to approve the first object for deployment, wherein the quantity describes how many approving parties are required to approve the first object for deployment, and wherein the credentials identify a required title of each party required to approve the first object for deployment;
associating the web service object with a service level description object, wherein the service level description object describes guaranteed features of the first object when deployed;
in response to said associating of the web service object with the service level description object, implementing the governance lifecycle process for the service level description object by transmitting a second approval process input to the governance approval process engine, wherein the second approval process input describes a second set of one or more reviewers needed to approve the service level description object, wherein the first set of one or more reviewers and the second set of one or more reviewers are mutually exclusive sets of different reviewers;
displaying an approval status of each person in the first and second sets of one or more reviewers, wherein the approval status represents an approval status from each person in the first and second sets of one or more reviewers, and wherein the approval status is from a group consisting of pending, approved and rejected;
in response to the governance approval process engine approving the first object for deployment to the production service registry, automatically deploying the first object to the production service registry;
in response to the second set of one or more reviewers approving the service level description object, continuing to automatically deploy the web service object to the production service registry; and
in response to the second set of one or more reviewers failing to approve the service level description object, automatically cancelling deployment of the web service object to the production service registry.

11. The computer system of claim 10, wherein the governance approval process engine is dynamically configurable to change approving parties and corporate rules required to deploy the web service object to the production service registry.

12. The computer system of claim 10, wherein the software, when executed, further causes the central processing unit to implement:
in response to the web service object, and the service level description object both failing to be approved by the governance approval process engine, revising a scope of the web service object to meet requirements of the service level description object.

13. The computer system of claim 10, wherein the lifecycle state is an interim state in a development of the first object.

14. A computer program product comprising a computer readable storage medium embodied therewith, the computer readable storage medium comprising:
computer readable program code configured to detect a change in a lifecycle state of a first object in a governance service registry, wherein the first object is a software object that is a web service object, wherein the web service object is proposed for deployment to a production service registry, and wherein the governance service registry is a system for storing, accessing and managing service metadata used in selecting, invoking, managing, governing and reusing services in a service oriented architecture (SOA);
computer readable program code configured to, in response to detecting the change in the lifecycle state of the first object, implement a governance lifecycle process for the first object by transmitting a first approval process input to a governance approval process engine, wherein the first approval process input describes a first set of one or more reviewers needed to approve the first object for deployment, wherein the first approval process input comprises a description of a quantity and credentials of reviewers needed to approve the first object for deployment, wherein the quantity describes how many approving parties are required to approve the first object for deployment, and wherein the credentials identify a title of each party required to approve the first object for deployment;
computer readable program code configured to associate the web service object with a service level description object, wherein the service level description object describes guaranteed features of the first object when deployed;
computer readable program code configured to, in response to said associating of the web service object with the service level description object, implement the governance lifecycle process for the service level description object by transmitting a second approval process input to the governance approval process engine, wherein the second approval process input describes a second set of one or more reviewers needed to approve the service level description object, wherein the first set of one or more reviewers and the second set of one or more reviewers are mutually exclusive sets of different reviewers;

computer readable program code configured to display an approval status of each person in the first and second sets of one or more reviewers, wherein the approval status represents an approval status from each person in the first and second sets of one or more reviewers, and wherein the approval status is from a group consisting of pending, approved and rejected;

computer readable program code configured to, in response to the governance approval process engine approving the first object for deployment to the production service registry, automatically deploy the first object to the production service registry;

computer readable program code configured to, in response to the second set of one or more reviewers approving the service level description object, continue to automatically deploy the web service object to the production service registry; and computer readable program code configured to, in response to the second set of one or more reviewers failing to approve the service level description object, automatically cancel deployment of the web service object to the production service registry.

15. The computer program product of claim 14, wherein the governance approval process engine is dynamically configurable to change approving parties and corporate rules required to deploy the web service object to the production service registry.

16. The computer program product of claim 14, wherein computer readable storage medium further comprises:

computer readable program code configured to, in response to the web service object and the service level description object both failing to be approved by the governance approval process engine, revise a scope of the web service object to meet requirements of the service level description object.

* * * * *